Aug. 20, 1935.  B. R. BENJAMIN  2,011,924
COTTON HARVESTER
Filed Oct. 11, 1928   3 Sheets-Sheet 3
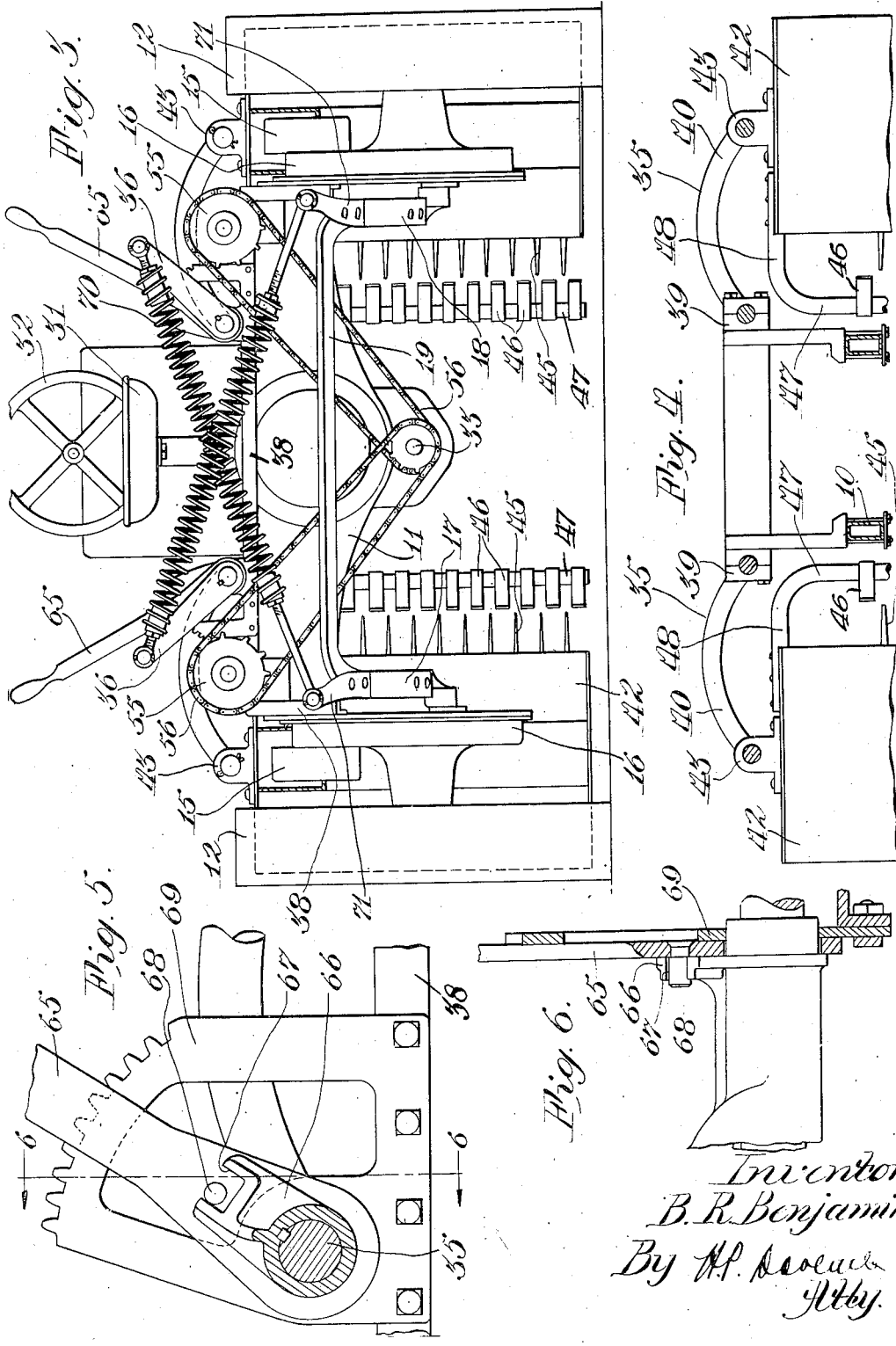
Inventor
B. R. Benjamin
By H. P. Doverick
Atty.

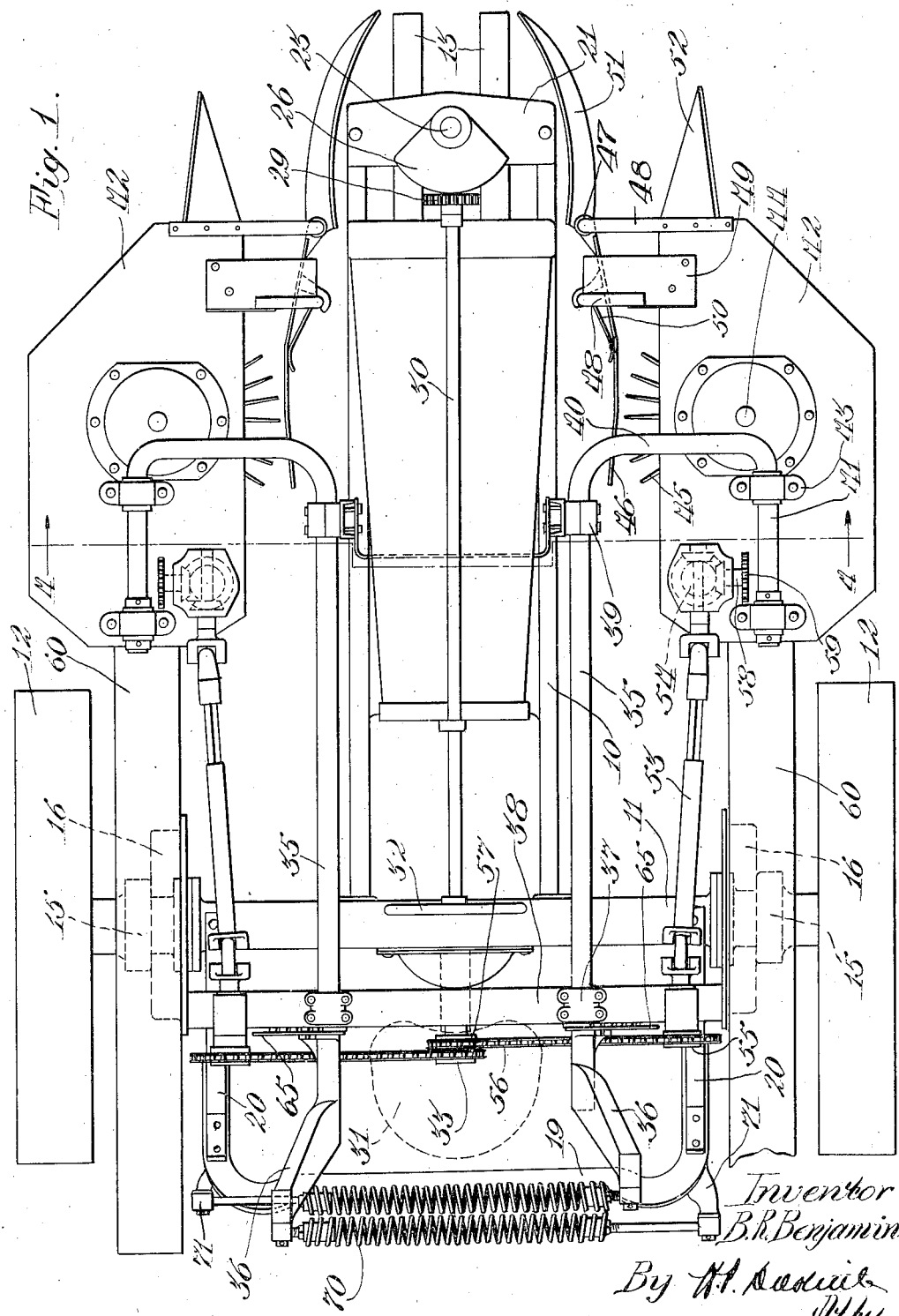

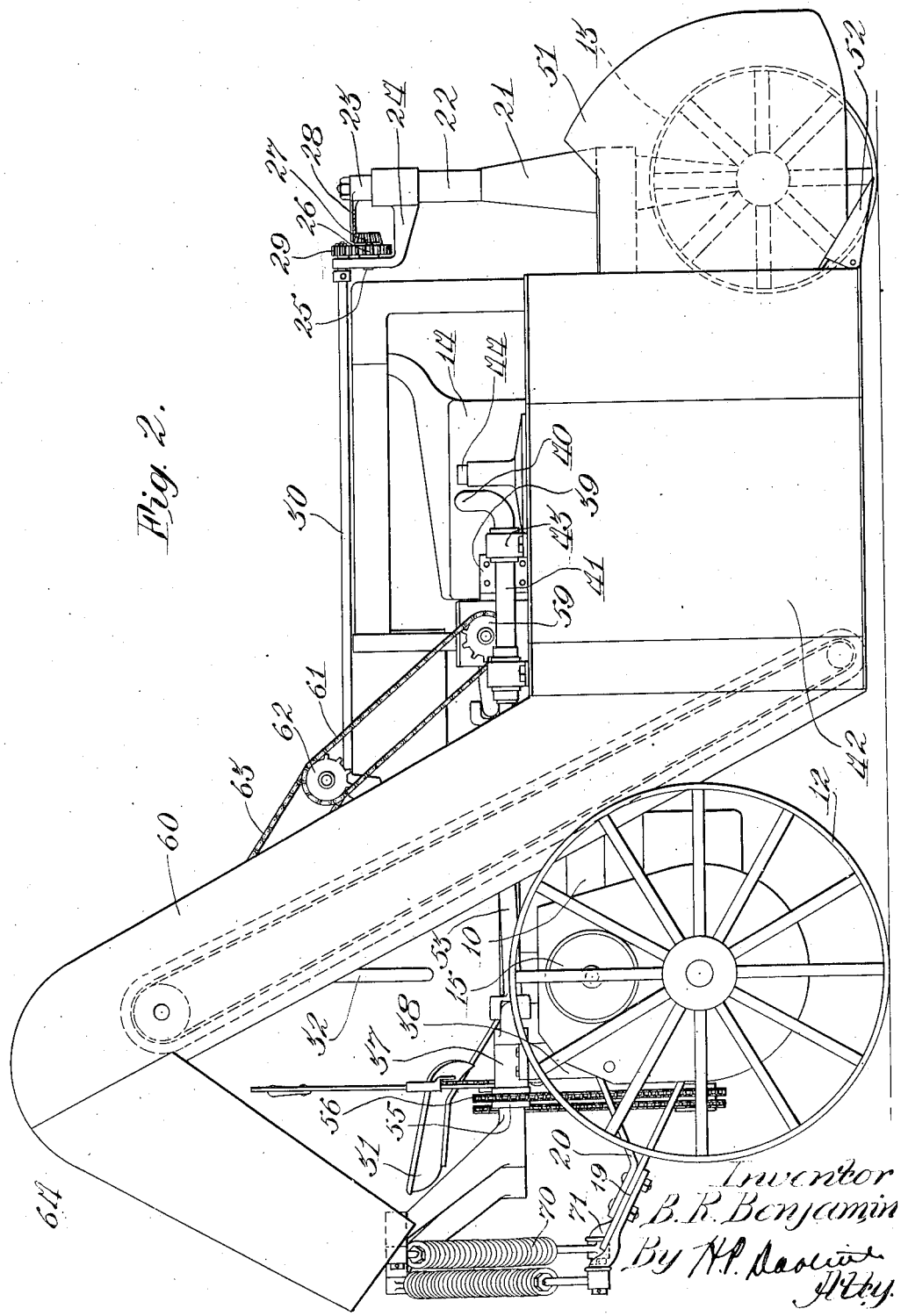

Patented Aug. 20, 1935

2,011,924

UNITED STATES PATENT OFFICE 2,011,924

COTTON HARVESTER

Bert R. Benjamin, Oak Park, Ill., assignor to International Harvester Company, a corporation of New Jersey Application October 11, 1928, Serial No. 311,734

REISSUED

20 Claims. (Cl. 56—14)

The present invention relates to harvesting machinery and is directed more particularly to improvements in self-propelled machines and to associations of cotton harvesting devices with a tractor of an existing type.

The principal object of the invention is to provide a self-propelled cotton gathering or harvesting machine, preferably of the spindle picker type, which will work efficiently on two rows of cotton plants at once while traveling at considerable speed, and which will be of light structure and easily controlled by a single operator. A further object is to so relate the harvesting units to the supporting structure or tractor as to distribute the weight and working strains advantageously and also locate the harvesting units within the treads of the traction wheels, with the front ends of the units adjacent the front wheel or wheels of the tractor so that the picking mechanism will be in view from the operator's station on the machine during operation. Still another object is to provide a cotton harvesting unit especially adapted for attachment to the side of farm tractors, preferably of the tricycle type, or other so-called "row-crop" types, and having provision for connection with the power plant of the tractor, the supporting and driving elements for the harvesting unit being such as to be easily attached to and detached from the tractor, which may, therefore, be of the general purpose type capable of receiving attachments of other kinds.

These objects, as well as other objects and advantages which will appear upon further description of the apparatus, are attained through provision of a machine characterized by a supporting or tractor structure having an extended rear axle and traction wheel portion spanning two rows, and a narrow, longitudinal body portion supported on dirigible supporting means such as a narrow tread dirigible truck at the front, running between adjacent rows, the body carrying cotton gathering units at one or both sides suspended at points approximately midway between the axes of the front and rear supporting wheels. These gathering units are floatingly suspended and spaced away from the body, and located within the tread lines of the traction wheels and are constructed to present the picking mechanism to the rows of cotton plants only from the side towards the machine body or tractor.

The invention accordingly resides in the organization and details of construction hereinafter more particularly described and claimed, and illustrated in the accompanying drawings, where:

Figure 1 is a plan view of an apparatus embodying the invention;

Figure 2 is a side view of the same;

Figure 3 is a rear view of the apparatus illustrated in the two previous figures;

Figure 4 is a transverse vertical section with parts omitted, taken on the line 4—4 of Figure 1;

Figure 5 is an enlarged detail view of an adjusting lever for the cotton gathering units; and Figure 6 is a similar detail view taken on the line 6—6 of Figure 5.

As illustrating a preferred embodiment of the invention, there is herein disclosed as forming a carrier for the cotton harvesting units, a wide tread tractor of the so-called tricycle type. This tractor comprises a narrow main frame or body 10 supported at the rear on the transverse axle structure 11, which extends laterally beyond both sides of the frame 10 to provide widely spaced rear traction wheels 12. The forward end of the tractor is supported on a steering truck 13, which preferably has two closely positioned wheels which are located midway between the two traction wheels 12, the wheel arrangement being such that the machine can straddle two rows of plants. Between the side rails forming part of the main body 10 of the tractor there is mounted a suitable power plant, or engine, 14 to the rear of which are located the clutch, transmission, and differential housings. The axle structure 11 contains differentially driven shafts which project beyond the axle structure at each end where they are provided with brake drums 15. The axle structure also includes depending gear housings 16 within which there is journaled a large gear fixed to the spindle of the traction wheel and driven by a suitable pinion on one of the differential shafts contained in the axle structure. The inner faces of the gear housings 16 carry brackets 17 and 18 to which is connected an arched bar 19, as best seen in Figure 3. Suspension braces 20 secured to each arm of the arched bar 19 and to the axle structure serve to support the arched bar in rearwardly and upwardly extending position, as seen in Figures 2 and 3. The forward end of the narrow longitudinally extending body of the tractor is provided with a crosshead preferably consisting of a single casting having a horizontally extending transverse portion 21 provided with a central, upwardly extending, tubular portion 22. The tubular portion 22 and the horizontal portion 21 of the crosshead provide bearings for the vertical standard or spindle 23 of the truck 13, which is thus made capable of turning or swiveling to steer the machine. The upper end of the tubular portion 22 has clamped to it a bracket 24 carrying a short shaft 25, on which pinions 26 and 27 are fixed. The upper end of the spindle 23 projects beyond the bracket 24 and has fixed to it a gear sector 28 in mesh with the pinion 27. The other pinion 26 is in mesh with a pinion 29 fixed on the forward end of a steering shaft 30 extending to the rear of the tractor in proximity to the driver's station or seat 31, where it is provided with a steering wheel 32. The shaft 30 is suitably supported in bearings at the front and rear of the tractor body, and it will be evident that rotation thereof will be communicated through pinions 26 and 27 to the gear sector 28 and the spindle 23 to steer the truck. Suitable brake mechanism acting on either of the brake drums 15 is provided to assist short turning of the tractor. At the rear end of the body portion of the tractor a power take-off shaft 33 projects on a level below the transverse portion of the axle structure, which shaft is driven through the transmission gearing of the power plant.

The supporting or tractor structure above described carries a harvesting unit on one or both sides, the illustration being of a two-row machine. As the cotton harvesting unit at each side of the tractor is the same, the structure of only one of them will be described, it being understood that the parts on the opposite side are duplicates, except for provision in the drive gearing for reversing the direction of rotation transmitted from the power take-off shaft 33. Accordingly, each side of the tractor has mounted thereon a longitudinally extending shaft 35, the rear end of which projects beyond the axle structure and has fixed to it an upwardly and rearwardly extending arm 36. The rear end of the shaft 35 is journaled in a bracket 37 secured to a cross member 38 extending across the tractor and secured to the axle structure. A second bearing bracket 39 is secured to the side of the tractor body and supports the forward end of the shaft 35. Immediately forwardly of the bearing bracket 39 the shaft 35 is formed with an outwardly, angularly extended portion 40, which is continued as a re-bent portion 41 extending parallel to the main portion of the shaft 35 and outwardly spaced therefrom. The re-bent portion 41 is thus located approximately midway between the axes of the front and rear supporting wheels. The re-bent portion 41 of the supporting shaft has suspended from it a housing 42 preferably formed of sheet metal. The housing is connected to the part 41 by means of the hinge brackets 43 in such manner as to permit the housing to have lateral swinging movement. The purpose of so mounting the housing 42 is to provide supporting means connecting the housing to the side of the tractor in such manner as to allow vertical and lateral movements of the housing with respect to the tractor about parallel axes extending longitudinally of the tractor, thereby allowing the picking means to adjust itself to variations in the plant rows. The housing 42 contains the cotton gathering mechanism, which in this instance consists of a single picker cylinder supported on a vertical shaft 44 journaled in the top and bottom of the housing 42. The inner side of the housing 42 is provided with an open portion from which the picker spindles 45 project during rotation of the picker drum, this inner side of the housing being positioned to flank the outer side of a row of cotton plants. Immediately opposite the open portion of the inner face of the housing there is provided a resistance grate made up of a series of spring arms 46 mounted on a depending shaft 47, an angular, horizontal portion 48 of which is fixed to the top of the housing 42 at its forward end. Preferably, a second vertical shaft 48ª located at the rear of the shaft 47, as illustrated on Fig. 1, and depending from a horizontal plate 49 secured to the top of the housing is provided and carries short spring fingers 50 making contact with the rear surfaces of the grate arms, or bars, 46, to increase the yielding resistance thereof. The shaft 47 also serves as the point of attachment for a forwardly extending shield and deflector 51, which is curved to enclose one side of the steering truck and act to direct the plants towards the picking mechanism. The forward portion of the housing 42 is provided with a corresponding deflecting shield 52, and the two shields 51 and 52 together form an entrance throat which guides the plants gathered between the shields into the channel between the inner side of the housing and the grate bars 46, where they are operated upon by the picker spindles. The cotton picking mechanism within the housing is actuated or driven from the power plant of the tractor through a telescopic shaft 53 provided with universal joints at either end and connected to a vertical drive shaft in the housing through a bevel pinion drive at 54. The other end of the drive shaft is journaled on the crossbar 38 and carries a sprocket wheel 55 connected by a sprocket chain 56 to a sprocket wheel 57 fixed on the power take-off shaft 33. The forward end of the drive shaft 53 also serves to drive a transverse stub shaft 58 carrying a sprocket wheel 59, which serves to drive conveyor mechanism contained in the delivery chute 60 extending from the rear face of the housing 42. Preferably, the drive is through a sprocket chain 61 passing over an intermediate, double sprocket 62 mounted on the conveyor housing and driving a second sprocket chain 63 which connects with the upper shaft of the conveying mechanism indicated in dotted lines in Figure 2. The upwardly and rearwardly extending conveyor housing 60 extends over the axle in the space between the adjacent traction wheel and the tractor body and terminates in a downwardly and rearwardly extending portion 64 through which the gathered cotton is discharged into a suitable receptacle or vehicle at the rear of the machine. The cotton picking mechanism will not be further described, as it specifically forms no part of the present invention and may be such as described and claimed in assignee's co-pending application by Johnston et al., Serial No. 303,646, filed September 4, 1928, since patented as No. 1,786,851 December 30, 1930.

To govern the adjustment of each harvesting unit individually as to height, there is provided a lever 65 for each unit which is pivoted on the rear end of the supporting shaft 35 and which cooperates with a stop arm 66 fixed on shaft 35 and formed with a wide notch 67 between the ends of which a pin 68 on lever 65 moves. The lever 65 cooperates with a rack 69 on cross member 38 on which it may be locked in adjusted position in the usual manner. The structure just described permits a certain amount of lost motion between the shaft 35 and the adjusting lever 65, limited by the length of slot 67, and the cotton harvesting unit is thus permitted a certain extent of vertical floating movement. To assist in lifting the harvesting units, through rotation of shafts 35, the arm 36 on the rear end of each shaft 35 is connected by means of a coil spring 70 with an abutment 71 secured to the arched bar 19 at one side thereof.

In operation the machine is driven over the plant rows with the rear wheels straddling two rows and the front truck wheels traveling in the space between the two rows straddled. The housing enclosing the gathering unit, or units if two are used, is thus brought into position on the outer side of the plant row which is received in the channel between the inner side of the housing and the resistance grate facing it. The plants in the row are received between the diverging fenders, or deflecting walls, 51—52 and the branches of the plants are gathered and gradually compressed and finally received between the inner face of the housing and the grate within the space intersected by the movement of the picker elements, which are projected, during operation, across the plant receiving channel.

It is to be noted that the manner of mounting and the location of the harvesting unit in the space between the tractor body and the traction wheel and of the picking mechanism on the outer side of the plant row are important features of the invention, as this permits location of a unit on each side of the tractor body in the same transverse lines and obviates interference between the units, or of the units with the tractor body and traction wheels, putting the picking mechanisms and the plant rows in direct view from the operator's station on the tractor, who is thus able to raise or lower either unit and guide the machine more accurately through steering movements of the dirigible truck.

While the present disclosure contemplates combination of the harvesting units with an existing type of tractor and disconnection therefrom when desired, there is no limitation of the invention to detachable mounting, as the invention can obviously be embodied in a unitary machine. In its preferred form, however, the harvesting unit, or units, constitute attachments capable of detachable connection in a novel manner to farm tractors now in general use, the manner in which the attachment is constructed and adapted for such connection being part of the invention. The invention, therefore, may be viewed from different aspects and is capable of different embodiments and modifications, as defined in the following claims.

What is claimed is:

1. The combination with a tractor having a front steering truck, rear traction wheels spaced to span two plant rows and a narrow longitudinally extended body, of a row crop harvesting unit including upright housings located at each side of the body within the tread lines of the traction wheels, and means on the body between the axes of the front and rear wheels for suspending the housings in laterally spaced relation to the body.

2. The combination with a tractor having a narrow longitudinally extended body supported at the front on a steering truck adapted to travel in the space between adjacent plant rows, of an outwardly projecting support connected to the side of the body, and cotton gathering mechanism comprising an upright housing suspended for transverse swinging movement from the outer portion of said support and positioned to overhang an adjacent plant row.

3. The combination with a tractor having a longitudinally extended body portion, of a supporting member extending along the body and having a laterally projecting extension on its forward end, means connecting said member to the body for rotative adjustment about a longitudinal axis, a cotton gathering device suspended from said lateral extension, and driving means connecting the gathering device with the power plant of the tractor.

4. The combination with a tractor having a longitudinally extended body portion, of a supporting shaft extending along the body and having a laterally projecting extension on its forward end terminating in a second extension parallel with the shaft, means for journaling the shaft on the tractor on a longitudinal axis, means for adjusting the shaft on its axis including a lost motion connection between the shaft and the adjusting means, a cotton gathering device suspended for lateral swinging movement from said second extension, and driving means connecting the gathering device with the power plant of the tractor.

5. The combination with a tractor having a longitudinally extended body portion, of a supporting shaft extending along the body and having a laterally projecting extension on its forward end terminating in a second extension parallel with the shaft, means for journaling the shaft on the tractor on a longitudinal axis, means for adjusting the shaft on its axis, a cotton gathering device suspended for lateral swinging movement from said second extension, and driving means connecting the gathering device with the power plant of the tractor.

6. The combination with a tractor having a longitudinally extended body portion, of a supporting shaft extending along the body and formed with a reversely bent portion at its forward end extending outwardly from the body, journal brackets on the side of the body in which said shaft is rotatively mounted, means for rotatively adjusting the shaft including a lo t motion connection for allowing limited free oscillation of the shaft, a cotton gathering device suspended for lateral swinging movement from the end of the reversely bent portion of the shaft, and driving means connecting the gathering device with the power plant of the tractor.

7. A self-propelled cotton harvester comprising a narrow longitudinally extending body, a power plant mounted thereon, dirigible supporting means at the front end of said body, a transversely extended axle structure secured to the rear end of said body, traction wheels on the ends of said axle structure, a laterally extending support pivotally mounted on the body in advance of the axle structure for adjustment in a vertical plane, means for adjusting said member, a housing pivotally suspended from said member, cotton gathering mechanism contained in said housing having gathering elements operating from the inner side of the housing, said inner side of the hou ing being positioned on a longitudinal plane extending between one side of the body and the tread line of the corresponding traction wheel, and a driving connection between the power plant and the gathering mechanism.

8. A self-propelled cotton harvester comprising a narrow longitudinally extending body, a power plant mounted thereon, dirigible supporting means at the front end of said body, a transversely extended axle structure secured to the rear end of said body, traction wheels on the ends of said axle structure, a support extending from one side of the body at a point between the front supporting means and the rear axle structure, a depending housing pivoted on said support on an axis extending longitudinally of the tractor, cotton gathering mechanism contained in said housing having gathering elements operating from the inner side of the housing and across a longitudinally extending path extending between that side of the body and the tread line of the corresponding traction wheel, and a driving connection between the power plant and the gathering mechanism.

9. A self-propelled cotton harvester comprising a narrow longitudinally extending body, a power plant thereon, a narrow tread dirigible truck pivoted on a vertical axis to the forward end of said body, a transversely extended axle structure secured to the rear end of said body, traction wheels on the ends of the axle structure, cotton gathering mechanism suspended from one side of the body comprising a housing spaced outwardly from the body to afford a row crop receiving space between the inner side of the housing and the vertical plane in which the side of the body lies, cotton gathering mechanism contained in said housing having gathering elements operating from the inner side of the housing, a yieldable wall supported opposite the inner side of the housing and therewith forming a plant row receiving channel, a forward extension on said wall enclosing a side of the truck and forming a plant deflecting means, and a driving connection between the power plant and gathering mechanism.

10. A self-propelled cotton harvester comprising a narrow longitudinally extending body, a power plant mounted thereon including a power take-off shaft projecting at the rear end of the body, dirigible supporting means at the front end of said body, a transversely extended axle structure supporting the rear end of the body, traction wheels on the ends of said axle structure, a housing suspended from each side of the body and located on transverse lines between the front supporting means and the rear axle structure, cotton gathering mechanisms contained in said housings having gathering elements operating from the inner sides of the respective housings and across longitudinally extending paths adjacent the opposite sides of the body, and driving connections between the power take-off at the rear of the body and each of the gathering mechanisms.

11. The combination with a tractor of the type having rear wheels spaced to span two plant rows, of cotton gathering mechanism carried by the tractor at the side thereof and located in advance of the axis of the rear wheels and within the tread lines thereof, and means supporting said gathering mechanism on the tractor for movements vertically and transversely.

12. The combination with a tractor of the type having front steering support and rear traction wheels spaced to span two plant rows, of cotton gathering mechanism carried by the tractor at the side thereof and located between the steering support and the traction wheels and within the tread lines of the traction wheels, and means for pivotally suspending the gathering mechanism for movement vertically and laterally about axes extending longitudinally of the tractor.

13. The combination with a tractor having a narrow longitudinally extended body, a rear axle structure spanning two plant rows and supported on traction wheels, a narrow tread dirigible truck supporting the front end of the body and a power take-off shaft projecting longitudinally from the rear end of the body, of longitudinally extending supporting shafts mounted in bearings on each side of the body and extending from the axle structure forwardly to a transverse line substantially midway between the axle and truck, a laterally extending arm on the forward end of each shaft, cotton gathering mechanism suspended from the end of each arm and positioned to flank the outer sides of the plant rows spanned by the rear axle structure, driving connections between the power take-off shaft and each gathering mechanism, and means on the tractor for rotatably adjusting the shafts to lift and lower the gathering mechanisms including means permitting limited free oscillation of each shaft.

14. The combination with a tractor having a longitudinally extended body portion and rear traction wheels, of a supporting member pivoted on the side of the body portion for movement vertically and projecting laterally from the tractor body forward of the traction wheels, cotton gathering mechanism including a vertical housing pivoted to the supporting member on an axis parallel to the tractor body, means for adjusting the elevation of the housing, and means for driving the gathering mechanism in all positions of the housing.

15. A tractor attachment comprising a shaft having a lateral extension constituting a supporting element, supports for the shaft having bearings in which the shaft is journaled at longitudinally spaced locations, said supports including means for securing them on the side of a tractor with the shaft extending longitudinally thereof, a cotton picking unit comprising a housing connected at its upper end to the end of the lateral extension on said shaft, and means on one of said supports for rotatively adjusting said shaft in its bearings on the supports.

16. A self-propelled cotton harvester comprising a narrow longitudinally extending body, dirigible supporting means at the front end of said body, a transversely extended axle structure supporting the rear end of the body, axle driving means, traction wheels on the ends of said axle structure, a housing suspended from each side of the body and located between the front supporting means and the rear axle structure, cotton gathering mechanism contained in said housings having gathering elements operating from the inner sides of the respective housings and across longitudinally extending paths adjacent the opposite sides of the body, and driving connections for the gathering mechanisms.

17. A self-propelled cotton harvester comprising a narrow longitudinally extending body, a power plant thereon, a narrow tread dirigible truck pivoted on a vertical axis to the forward end of said body, a transversely extended axle structure secured to the rear end of said body, traction wheels on the ends of the axle structure, cotton gathering mechanism suspended from one side of the body comprising a housing spaced outwardly from the body to afford a row crop receiving space between the inner side of the housing and the vertical plane in which the side of the body lies, cotton gathering mechanism contained in said housing having gathering elements operating from the inner side of the housing, a wall supported opposite the inner side of the housing and therewith forming a plant row receiving channel, a forward extension on said wall enclosing a side of the truck and forming a plant deflecting means, and a driving connection between the power plant and gathering mechanism.

18. A harvesting machine comprising the combination of a tractor having a transversely extended rear axle structure supported on rear wheels adapted to run on the outside of adjacent plant rows, a narrow body extending forwardly from the center of the axle structure, a front rolling support on the body adapted to run between the same rows, a laterally extended support on each side of the body in advance of the rear wheels, a forwardly located harvesting unit pivotally mounted on each of said supports between the sides of the body and the tread lines of the respective rear wheels and in position to harvest from adjacent plant rows, plant gathering means carried by the harvesting units, said gathering means being positioned with the forward ends thereof substantially in transverse alignment with the front rolling support, means located between the rear wheels for conveying the harvested crop rearwardly, and means on the tractor for individually adjusting the harvesting units vertically.

19. A harvesting machine comprising the combination of a tractor having a transversely extended rear axle structure supported on rear wheels adapted to run on the outside of adjacent plant rows, a narrow body extending forwardly from the center of the axle structure, a front rolling support on the body adapted to run between the same rows, a laterally extended support on each side of the body in advance of the rear wheels, a harvesting unit pivotally mounted on each of said supports, crop gathering means carried by each harvesting unit and located between the sides of the body and the tread lines of the respective rear wheels and in position to harvest from adjacent plant rows, said gathering means being positioned with the forward ends thereof substantially in transverse alignment with the front rolling support, and conveying means on each unit extending upwardly and rearwardly over the rear axle structure within the spaces between the tractor body and the respective rear wheels.

20. A harvesting machine comprising the combination of a tractor having a transversely extended rear axle structure supported on rear wheels adapted to run on the outside of adjacent plant rows, a narrow body extending forwardly of the center of the axle structure, a front rolling support on said body, a laterally extended support on each side of the tractor body, a harvesting unit mounted on each of the said supports for adjustment vertically, each unit comprising crop gathering means located forward of the rear wheels and conveying means extending rearwardly therefrom within the spaces between the respective rear wheels and the tractor body, and means on the tractor for vertically adjusting the harvesting units.

BERT R. BENJAMIN.